United States Patent Office 2,860,053
Patented Nov. 11, 1958

2,860,053

NUT PRODUCTS

Fitzhugh L. Avera, Alameda, Calif., assignor, by mesne assignments, to The Best Foods, Inc., New York, N. Y., a corporation of New Jersey No Drawing. Application June 28, 1954
Serial No. 439,856

2 Claims. (Cl. 99—126)

The invention, in general, relates to the manufacture of foods and more particularly relates to the provision of improved nut products and nut bearing products, including nut flavoring additives for a variety of different types and forms of foods.

While the present invention is entirely suitable for adaptation, or is equally applicable, to a wide variety of nuts and nut bearing products, including peanuts, almonds, walnuts, filberts, pecans, cashew nuts, as well as ice creams and the like containing any one or combination of nuts, the invention will be described herein for purposes of brevity and explanation only in the environment of peanuts and peanut butter.

As is no doubt well known to those skilled in the art of manufacturing nut products and nut bearing products, certain undesirable odors and flavors develop, as well as unfavorable browning of the products ensues when such products are used in aqueous bearing media or are exposed to water or water vapor. On some occasions, a change in the physical state of the product occurs, suggesting coagulation. The present invention is directed to the provision of nut products and nut bearing foods having none of the foregoing deleterious factors and possessing advantageous behavior characteristics in the presence of water or water vapors not heretofore possessed by nuts and nut products heretofore marketed.

A primary object of my invention is to provide improved nut products capable of being freely mixed with any aqueous media, such as ice cream and the like, or with any baking mixture, or with any condiment without attendant undesirable browning or the development of distasteful flavors or odors and without coagulation.

Another important object of the present invention is to provide improved nut products of the indicated nature which is additionally characterized by its pleasant taste and aroma and its capability of being used directly as a food condiment or spread.

A still further object of the invention is to provide improved nut products of the aforementioned character which can be inexpensively produced.

Other objects of the invention, together with some of the advantageous features thereof, will appear from the following preferred embodiment described and certain modified embodiments of the invention. It is to be understood that I am not to be limited to the precise embodiments described, nor to any precise order of steps of preparing the same, as my invention, as defined in the appended claims, can be embodied in a plurality and variety of forms and can be produced in a plurality and variety of ways.

In its preferred form, as exemplified in a nut product per se, my present invention preferably comprises nut meat combined with a polyhydric alcohol which forms the major constituent of the product. As exemplified in a nut flavoring additive, the present invention preferably comprises a nut butter blended with an aqueous polyhydric alcohol wherein the latter constitutes approximately 59% by weight of the flavoring additive.

As directed to the production of my improved nut products, including nut flavoring additives, from peanuts and peanut butter, which are alluded to here solely for purposes of description of the present invention, a quantity of peanuts are roasted, blanched and shelled in the conventional manner to afford the basic nut or nut meat. Thereafter, the nuts or nut meats are blended with a polyhydric alcohol, and preferably with a polyhydric alcohol having more than three available hydroxyls in its composition. Polyhydric alcohols which I have employed with optimum results are commercially available as "Sorbitol" and "Mannitol." Either of these polyhydrics may be blended with whole or partial nut meats and the blending can be effected either by incorporating the polyhydric alcohol in or applying it on the nut meats. That is to say, the polyhydric alcohol may be present either in its crystal or solid state, or in liquefied form, such as an aqueous solution or dispersion. In all the improved nut products and nut flavoring additives, including peanuts and peanut butter flavorings, the polyhydric alcohol blended therewith comprises the major constituent, or approximately 59%, by weight, of the improved nut product or nut flavoring additive, per se, whether the polyhydric alcohol be blended therewith by coating or dusting onto the nut meats or be included in liquefied form by aqueous solution or dispersion.

In a preferred embodiment of peanut butter flavoring additive, a quantity of peanut butter is provided which can be prepared in any of the conventional modes including roasting, blanching and shelling peanuts and thereafter grinding the same to afford a comminuted homogeneous mass. An optimum flavoring additive of peanut butter has been achieved by utilizing the product described and claimed in my United States Letters Patent, No. 2,552,925, into which peanut butter there has been introduced the hexahydric alcohol, known as "Sorbitol," as a 70% aqueous solution, so that the added polyhydric alcohol comprises approximately 59%, by weight, of the flavoring additive with the balance or 41%, by weight, peanut butter.

In accordance with my present invention, nut products are provided which are coated with a moisture conditioning agent, preferably a polyhydric alcohol such as "Sorbitol" or "Mannitol," which affords resistance to staling, as well as rancidity. These new and different nut products comprising whole or partial nuts coated with the aforesaid polyhydric alcohol can be produced by coating the nuts with an aqueous solution of "Sorbitol" or "Mannitol" and allowing the nuts to set so as to lose their moisture content, or the moisture content can be deliberately removed by any of the well known methods common to the art. Or, solid or crystal forms of the polyhydric alcohol can be utilized by melting the same and applying the melted alcohol as a coat to the whole or partial nuts.

As is perhaps well known, it is presently the common practice to roast whole, split or chopped nuts in an oil bath. Such practice leaves a coating of fat on the roasted nuts which readily turns rancid and emanates an overpowering and somewhat obnoxious odor. By preparing the improved nut products of the present invention by roasting the nuts in the non-fat medium of melted "Sorbitol" or "Mannitol," a unique pleasing flavor is afforded to the nuts which retain such flavor, as well as their crispness for appreciable periods of time. It may also be observed that the improved nuts and nut products of the present invention, having the coating thereon of the aforesaid polyhydric alcohol, are substantially non-oxidizable since the characteristics common to oil bath roasted nuts have become eliminated. That is to say, by coating the nut with the polyhydric alcohol as aforesaid the nut surface is converted from a hygroscopic to a substantially non-hygroscopic nature so that the improved nut product of the present invention will not absorb moisture by hygroscopic equilibration, and its flavor and texture is retained.

When reference herein is made to polyhydric alcohols it is, of course, understood that these alcohols are all edible, no toxic substance being combined in any way with the nut meat or the nut butter.

It is to be understood that the appended claims are to be accorded a range of equivalents commensurate in scope with the advance made over the prior art.

I claim:

1. A nut product comprising a roasted nut, and a peripheral coating of Sorbitol thereon.

2. Nut products comprising nut portions, and a peripheral coating of Sorbitol on each of said portions.

References Cited in the file of this patent

UNITED STATES PATENTS

| | | |
|---|---|---|
| 2,166,806 | Du Puis et al. | July 18, 1939 |
| 2,552,925 | Avera | May 15, 1951 |
| 2,631,104 | Welker | Mar. 10, 1953 |

OTHER REFERENCES

"Sorbitol," by Childs, The Manufacturing Confectioner, October 1945, pp. 26 and 28.